US012798489B2

(12) United States Patent
Meeks

(10) Patent No.: US 12,798,489 B2
(45) Date of Patent: Nov. 17, 2026

(54) GARMENT TRANSPORT APPARATUS WITH HEADREST MOUNTING

(71) Applicant: Ryan Meeks, Houston, TX (US)

(72) Inventor: Ryan Meeks, Houston, TX (US)

(*) Notice: Subject to any disclaimer, the term of this patent is extended or adjusted under 35 U.S.C. 154(b) by 68 days.

(21) Appl. No.: 19/202,189

(22) Filed: May 8, 2025

(65) Prior Publication Data

US 2025/0353439 A1 Nov. 20, 2025

Related U.S. Application Data

(60) Provisional application No. 63/647,686, filed on May 15, 2024.

(51) Int. Cl.
*B60R 7/10* (2006.01)
*B60R 11/00* (2006.01)

(52) U.S. Cl.
CPC ................ *B60R 7/10* (2013.01); *B60R 11/00* (2013.01); *B60R 2011/0017* (2013.01)

(58) Field of Classification Search
CPC .............. B60R 7/10; B60R 2011/0017; A47G 25/1457; A47G 25/0692; Y10S 224/927
USPC ........................................ 224/275, 313, 927
See application file for complete search history.

(56) References Cited

U.S. PATENT DOCUMENTS

| | | | | |
|---|---|---|---|---|
| 1,722,122 | A * | 7/1929 | Wilson | A47G 25/16 248/302 |
| 3,549,065 | A * | 12/1970 | Schubert | A47G 25/1457 294/143 |
| 3,578,226 | A * | 5/1971 | Good | A47G 25/1457 294/137 |
| 4,094,414 | A | 6/1978 | Thiot | |
| 4,887,727 | A | 12/1989 | Simmerman | |
| 5,383,588 | A * | 1/1995 | Kazel | A47G 25/14 224/927 |
| D543,367 | S | 5/2007 | Sack | |
| 8,573,689 | B2 | 11/2013 | Golo | |
| 2013/0015223 | A1 | 1/2013 | Fleming | |
| 2015/0274082 | A1* | 10/2015 | Khazadian | B60R 7/10 24/716 |

* cited by examiner

*Primary Examiner* — Adam J Waggenspack
(74) *Attorney, Agent, or Firm* — Brennan, Manna & Diamond, LLC

(57) ABSTRACT

The present invention is a portable hanger support device for transporting garments in a vehicle. The device includes a downward concave sweeping hook configured to anchor over a vehicle seat headrest, a right slant vertical segment member, a left slant vertical segment member, a semicircular lower hook bend for supporting a plurality of hangers, and an upward-extending hanger stopper stub to prevent lateral movement of hangers. The device abuts opposite (i.e., opposing) surfaces of the headrest to maintain a secure position and to support garments in an upright, aligned, wrinkle-free condition during transit. A smooth end cap is included on at least one end to prevent damage to vehicle interiors. The device further includes a removable ergonomic handgrip positioned on the right slant vertical segment member, providing user comfort and headrest protection.

20 Claims, 5 Drawing Sheets

GARMENT TRANSPORT APPARATUS WITH HEADREST MOUNTING

CROSS-REFERENCE TO RELATED APPLICATION

The present application claims priority to, and the benefit of, U.S. Provisional Application No. 63/647,686, which was filed on May 15, 2024, and is incorporated herein by reference in its entirety.

FIELD OF THE INVENTION

The present invention generally relates to garment transport and organization devices for use in vehicles. More specifically, the invention relates to a portable, hanger support device configured to secure dry-cleaned garments during vehicle transit in an upright, aligned, and wrinkle-free condition. The device is formed from a single bent rod and is designed to hook over a vehicle seat headrest without the need for permanent installation or tools. The device supports multiple garment hangers on a semicircular lower hook segment while preventing lateral movement and hanger slippage using strategically angled vertical members and an integrated stopper stub. The invention provides a stable, ergonomic solution for transporting clothing (i.e., dry-cleaned clothing), minimizing creases, tangling, and disorganization while offering compatibility with a wide variety of vehicle interiors. Accordingly, the present disclosure makes specific reference thereto. Nonetheless, it is to be appreciated that aspects of the present invention are also equally applicable to other like applications, devices, and methods of manufacture.

BACKGROUND

By way of background, many individuals frequently utilize dry cleaning services and often face significant challenges when transporting garments between the dry cleaner and their vehicle, and subsequently to their home or workplace. Individuals are required to carry multiple hangers manually, which can be cumbersome and uncomfortable due to the collective weight and thin profiles of standard wire hangers. The conventional method also results in tangled hangers, dropped items, or physical strain on the user's hands and fingers.

Alternative methods such as placing garments into hampers, baskets, or the vehicle's rear seat typically lead to garments sliding around during transit, becoming disorganized or wrinkled. Relying on the in-built car hooks above passenger windows offers limited capacity of only one or two hangers per hook and therefore can be impractical for larger loads. The built-in hooks may also cause garments to hang at an angle, leading to creases, and can interfere with driver visibility or passenger comfort when overloaded. Existing solutions are inefficient, bulky, and fail to accommodate a reasonable number of garments while maintaining garment quality. Individuals desire a durable, ergonomic, and vehicle-compatible solution that enables users to transport multiple garments in an upright, aligned, and wrinkle-free condition.

Therefore, there exists a long-felt need in the art for a portable garment organizing device that enables individuals to efficiently transport multiple dry-cleaned garments to and from their vehicle without wrinkling or disorganization. There is a long-felt need for a garment support device that is easy to use, minimizes physical strain when lifting multiple hangers, and securely fits within a vehicle without requiring permanent installation. Additionally, there exists a long-felt need for a device that holds garments in a neat, upright, and aligned configuration while preventing lateral movement and hanger slippage during transit. Furthermore, there is a long-felt need for a garment support solution that is compact, lightweight, and compatible with a wide variety of vehicle headrests. M ore specifically, there is a long-felt need for a durable, ergonomic, and vehicle-integrated hanger transport tool that maintains the pressed condition of garments and simplifies the dry-cleaning pickup and drop-off process. Finally, there is a long-felt need in the art for a device that hangs without impeding the driver's view out of the vehicle windows to retain safety and saves considerable time and effort when transporting clothing garments.

The subject matter disclosed and claimed herein, in one embodiment, comprises a portable hanger support device designed to temporarily organize garments during vehicle transport. The device is constructed from a single cylindrical rod bent into a generally "G" shape or form. The design includes a downward concave sweeping hook for anchoring the device over a vehicle headrest, a right slant vertical segment member configured to rest against one surface of the headrest, and a left slant vertical segment member leading into a semicircular lower hook bend for supporting multiple garment hangers. An upward-extending hanger stopper stub positioned opposite the right slant vertical segment prevents lateral movement of the hangers and provides a gripping point for the user. Both end portions in contact with the headrest may include smooth protective caps to prevent wear or damage to vehicle surfaces.

In another embodiment, the portable hanger support device further comprises a removable ergonomic handgrip positioned on the right slant vertical segment member. The handgrip is formed from a resilient, non-slip material to provide user comfort while carrying the device and to prevent scuffing or abrasion to the vehicle's headrest. The overall structure is configured to support at least twenty garments without compromising alignment or stability.

In this manner, the portable hanger support device of the present invention fulfills the long-felt need for a reliable, ergonomic, and vehicle-compatible tool that enables users to carry, organize, and transport dry-cleaned garments in an upright, aligned, and wrinkle-free condition. The device eliminates the hassle of manual hanger handling or makeshift transport methods such as baskets or car-seat placement. The device simplifies the dry-cleaning process for individuals, professionals, or delivery drivers who regularly manage large volumes of garments. The invention can be manufactured in various materials, such as aluminum or molded plastic, and adapted to accommodate different vehicle headrest styles.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a portable hanger support device for organizing garments in a vehicle. The device comprises a single cylindrical rod bent into a generally "G"

shape or form, the cylindrical rod includes a downward concave upper sweeping hook configured to anchor the device over a headrest of a vehicle seat, a right slant vertical segment member extends downward from a first end of the upper sweeping hook, the right slant vertical segment member terminates at a free end and configured to abut a first surface of the headrest, a left slant vertical segment member extends from an opposite end of the upper sweeping hook, the left slant vertical segment member is shorter than the right slant vertical segment member, a lower hook bend extends from the left slant vertical segment member, the lower hook bend forms a semicircular arc portion configured to accommodate a plurality of garment hangers, and a hanger stopper stub extends upward from an end of the lower hook bend opposite the left slant vertical segment member, the hanger stopper stub is configured to abut a second surface of the headrest and to prevent lateral displacement of hangers on the lower hook bend.

In another aspect, a method for transporting garments in a vehicle using a portable hanger support device comprises a single bent rod having a sweeping hook, vertical segment members, a lower hook bend, and a stopper stub, the method comprises positioning the sweeping hook over a headrest of a vehicle seat such that the sweeping hook rests on a top surface of the headrest, orienting a first vertical segment member to abut a first surface of the headrest and a hanger stopper stub to abut a second, opposite surface of the headrest, supporting a plurality of garment hangers on the lower hook bend of the device such that the hangers are suspended in a vertical orientation, and preventing lateral movement of the hangers using the left vertical segment member and the hanger stopper stub, whereby garments suspended from the hangers are maintained in an upright, aligned, and flat condition without wrinkling during transit.

In another embodiment, a portable hanger support device for organizing garments in a vehicle, comprises a rod bent into a generally G-shaped profile and configured to engage a headrest of a vehicle seat, a telescoping right slant vertical segment member includes a plurality of locking pins configured to selectively adjust the length of the right slant vertical segment member to accommodate varying headrest sizes and garment quantities, a lower hook bend extends from a left slant vertical segment member, the lower hook bend forms a semicircular arc portion configured to support a plurality of garment hangers, a hanger stopper stub extending upward from an end of the lower hook bend, the stopper stub configured to prevent hangers from slipping off the bend, and a locking latch or clip is disposed on the downward concave sweeping hook configured to secure the device around the headrest during vehicle motion.

In one embodiment, an ergonomic handgrip is removably positioned on the right slant vertical segment member, the handgrip is made of a resilient, non-slip material configured to provide comfort to a user and prevent abrasion or pressure marks on the headrest.

In yet another aspect, the device includes one or more end caps for a slip-resistant and safe contact of the device with the headrest.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
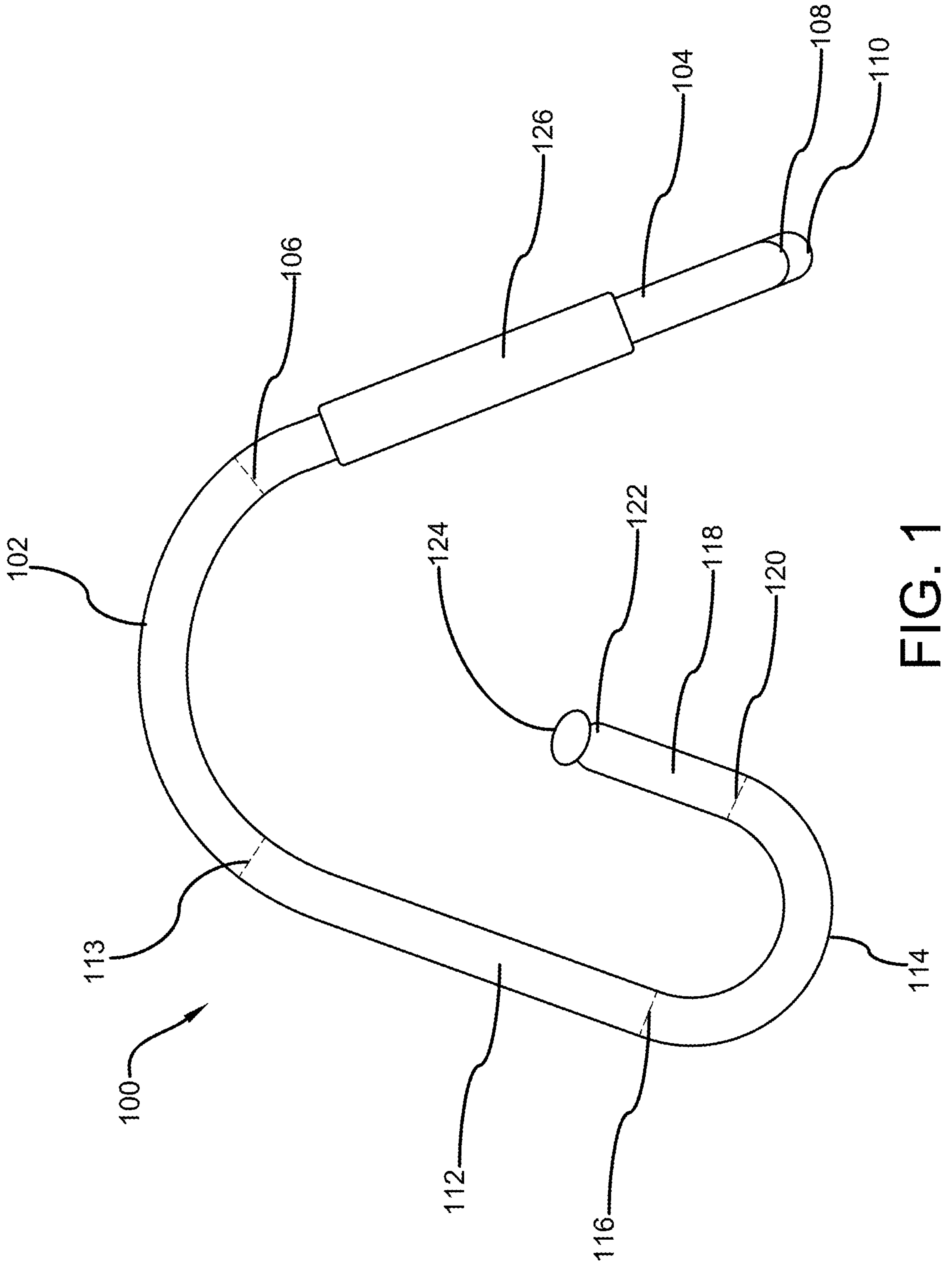
FIG. 1 illustrates a perspective view of the portable hanger support device of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a portable garment organizing device that enables individuals to efficiently transport multiple dry-cleaned garments to and from their vehicle without wrinkling or disorganization. There is a long-felt need for a garment support device that is easy to use, minimizes physical strain when lifting multiple hangers, and securely fits within a vehicle without requiring permanent installation. Additionally, there exists a long-felt need for a device that holds garments in a neat, upright, and aligned configuration while preventing lateral movement and hanger slippage during transit. Furthermore, there is a long-felt need for a garment support solution that is compact, lightweight, and compatible with a wide variety of vehicle headrests. M ore specifically, there is a long-felt need for a durable, ergonomic, and vehicle-integrated hanger transport tool that maintains the pressed condition of garments and simplifies the dry-cleaning pickup and drop-off process, and/or the garment transporting process. Finally, there is a long-felt need in the art for a device that hangs garments in a vehicle without impeding the driver's view out of the vehicle windows to retain safety and saves considerable time and effort when transporting clothing garments.

The present invention, in one exemplary embodiment, is a portable hanger support device for organizing and transporting garments in a vehicle, comprises a rod bent into a generally G-shaped profile and configured to engage a headrest of a vehicle seat, a telescoping right slant vertical segment member includes a plurality of locking pins configured to selectively adjust the length of the right slant vertical segment member to accommodate varying headrest sizes and garment quantities, a lower hook bend extends from a left slant vertical segment member, the lower hook bend forms a semicircular arc portion configured to support a plurality of garment hangers, a hanger stopper stub extending upward from an end of the lower hook bend, the stopper stub configured to prevent hangers from slipping off the bend, and a locking latch or clip disposed on the downward concave sweeping hook configured to secure the device around the headrest during vehicle motion or transport.

Reference will now be made in detail to the present preferred embodiments of the invention, examples of which are illustrated in the accompanying drawings. Wherever possible, the same reference numerals are used in the drawings and the description to refer to the same or like parts.

Referring initially to the drawings, FIG. 1 illustrates a perspective view of a portable hanger support device of the present invention in accordance with the disclosed structure. The portable hanger support device 100 of the present invention is designed to temporarily organize the garments inside a vehicle during transit. Preferably, the portable hanger support device 100 is configured to transport a plurality of garments in upright, stable, and flat positions without wrinkles. The portable hanger support device 100 is durable and space-efficient and is designed to utilize headrests of vehicle seats for support.

More specifically, the portable hanger support device 100 is formed from a single cylindrical rod 101 bent into a generally "G" shape or form. The portable hanger support device 100 has a downward concave upper sweeping hook 102 to assist the portable hanger support device 100 in anchoring over a vehicle headrest. A right slant vertical segment member or portion 104 extends downward from the first end 106 of the downward concave upper sweeping hook 102 and terminates at the free end 108 of the right slant vertical segment member or portion 104. The right slant vertical segment member or portion 104 abuts against one of the surfaces of the headrest and includes a smooth end cap 110 for preventing damage to the headrest.

A left slant vertical segment member or portion 112 extends from an opposing end 113 of the downward concave upper sweeping hook 102. The left slant vertical segment member or portion 112 is shorter in length than the right slant vertical segment member or portion 104 and terminates at a first end 116 of a lower hook bend 114. The lower hook bend 114 is a semicircular loop and is designed to provide a wrapping arc portion to accommodate a plurality of hangers. A hanger stopper stub 118 extends upwards from an opposite second end 120 of the lower hook bend 114 and is configured to provide a grip stop or anti-slip catch or area for hangers, and also serves as the entry point or open area for the user to grip the device. The hanger stopper stub 118 abuts against the opposite surface of the headrest (surface opposite to the one of the surfaces where the right slant vertical segment member or portion 104 abuts the headrest). The top end 122 of the hanger stopper stub 118 includes a smooth end cap 124 for preventing damage to the headrest.

An ergonomic handgrip 126 is removably positioned on the right slant vertical segment member or portion 104 for providing a comfortable grip to a user and preventing any damage to the headrest. The portable hanger support device 100 is preferably made from a durable and corrosion-resistant material like aluminum, plastic, or any other similar material. The portable hanger support device 100 can accommodate up to 20 garments without bending of the device 100. Further, the right slant vertical segment member or portion 104 can be adjusted, enabling the device 100 to fit most vehicle headrests easily.

Figure 2:
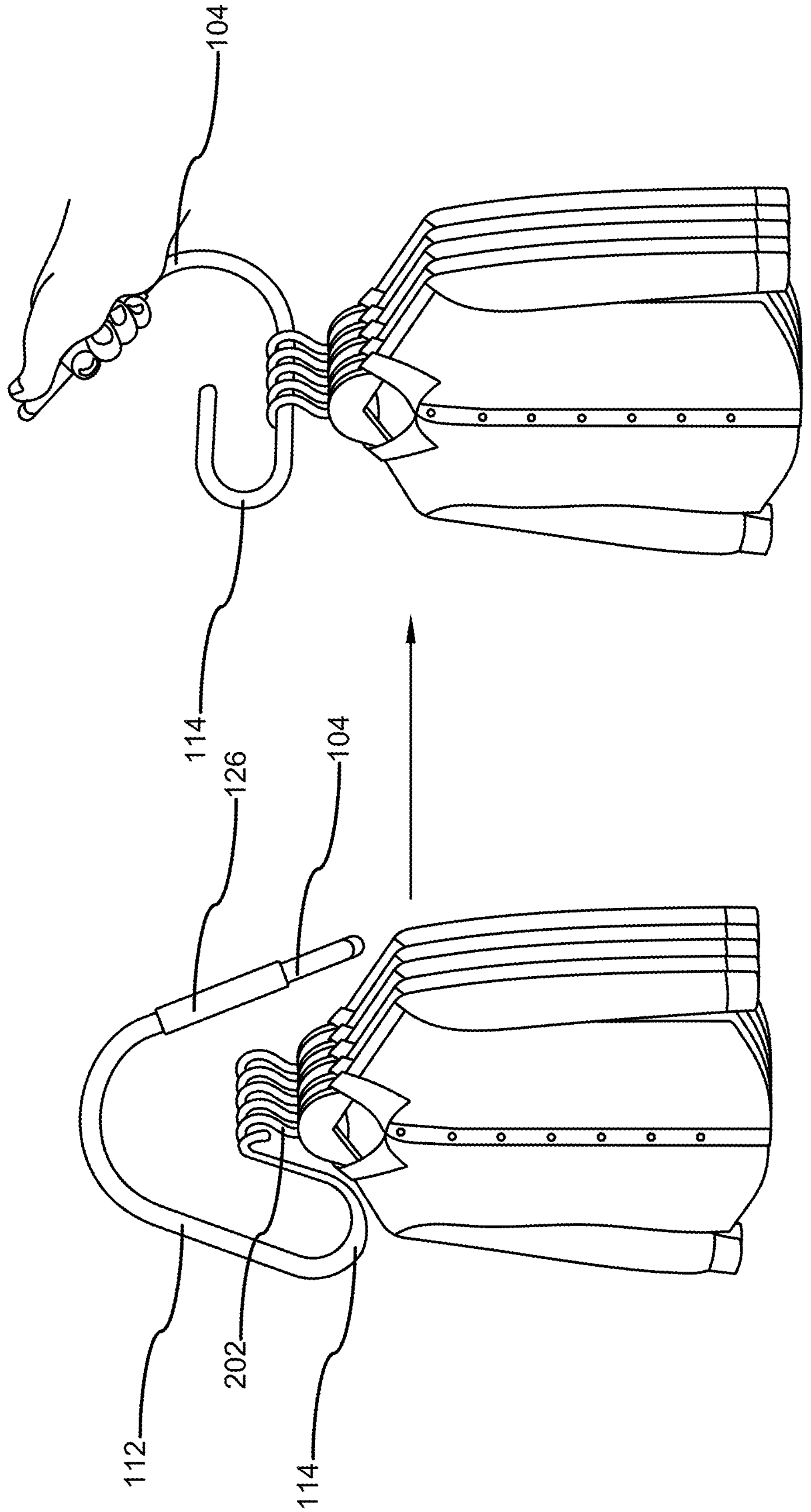
FIG. 2 illustrates a perspective view showing a plurality of clothes supported by the portable hanger support device while being held by a user in accordance with the disclosed structure.

FIG. 2 illustrates a perspective view showing a plurality of clothes supported by the portable hanger support device 100 while being held by a user in accordance with the disclosed structure. The portable hanger support device 100 can accommodate up to twenty garments, wherein each garment can be supported by an individual hanger 202. Each hanger 202 is accommodated and supported on lower hook bend 114, and the lateral movement of the hangers is prevented by the left slant vertical segment member or portion 112 and the hanger stopper stub 118. Each hanger 202 can be accommodated from the top of the hanger stopper stub 118, and the device 100 can be easily held using the ergonomic grip 126.

Figure 3:
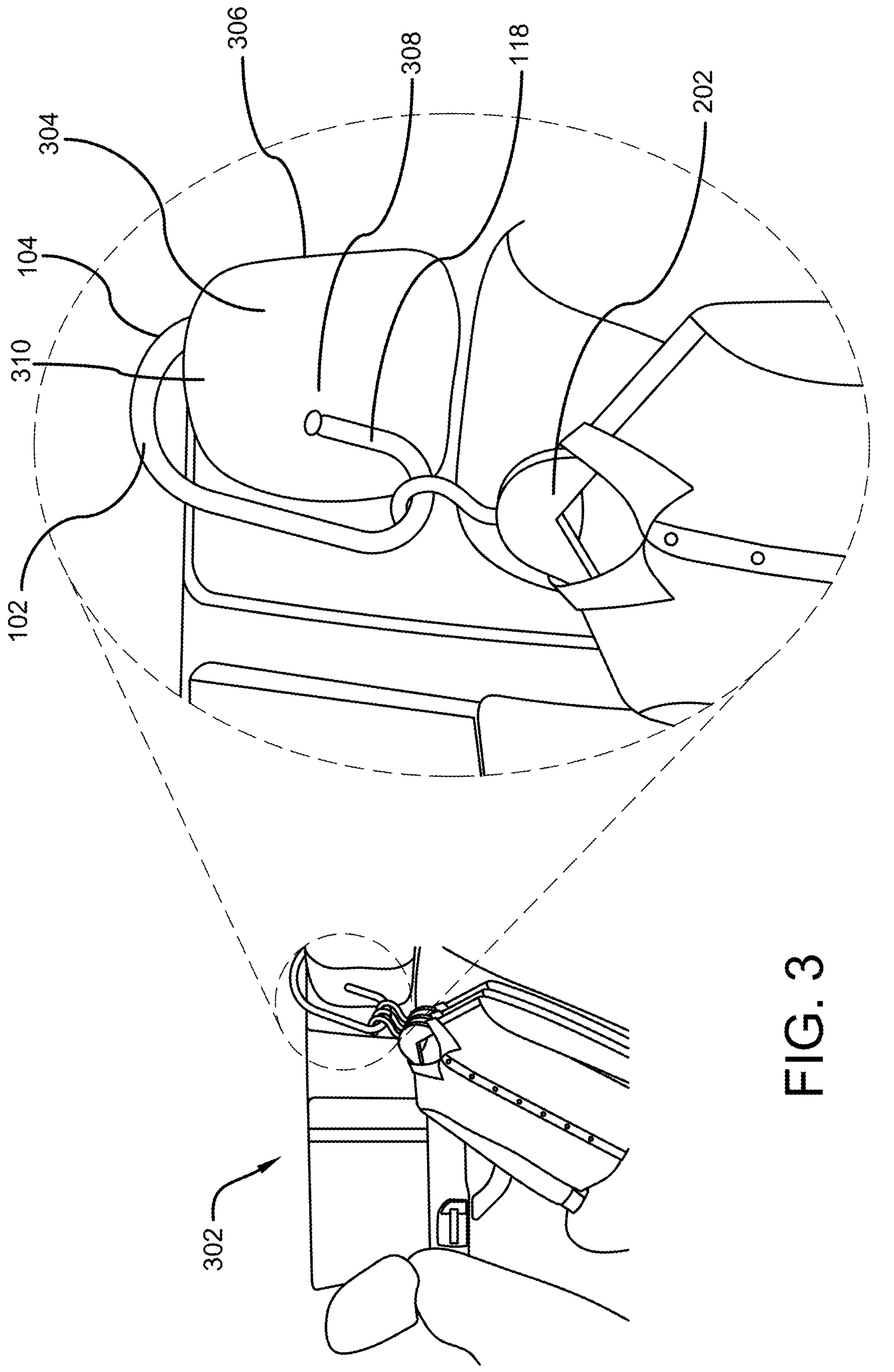
FIG. 3 illustrates a perspective view showing the portable hanger support device of the present invention being secured to a headrest of a vehicle for storing clothing in accordance with the disclosed structure.

FIG. 3 illustrates a perspective view showing the portable hanger support device of the present invention being secured to a headrest of a vehicle for storing clothing in accordance with the disclosed structure. The device 100 can be used with the existing infrastructure of a vehicle 302 and specifically with a headrest 304. The device 100 is positioned on the headrest 304 such that the right slant vertical segment member or portion 104 and the hanger stopper stub 118 abut against opposite sides/surfaces 306, 308 respectively of the headrest 304. The downward concave upper sweeping hook 102 rests on the top surface 310 of the headrest 304, and the hangers 202 are easily accommodated without folding and wrinkling of the clothing.

Figure 4:
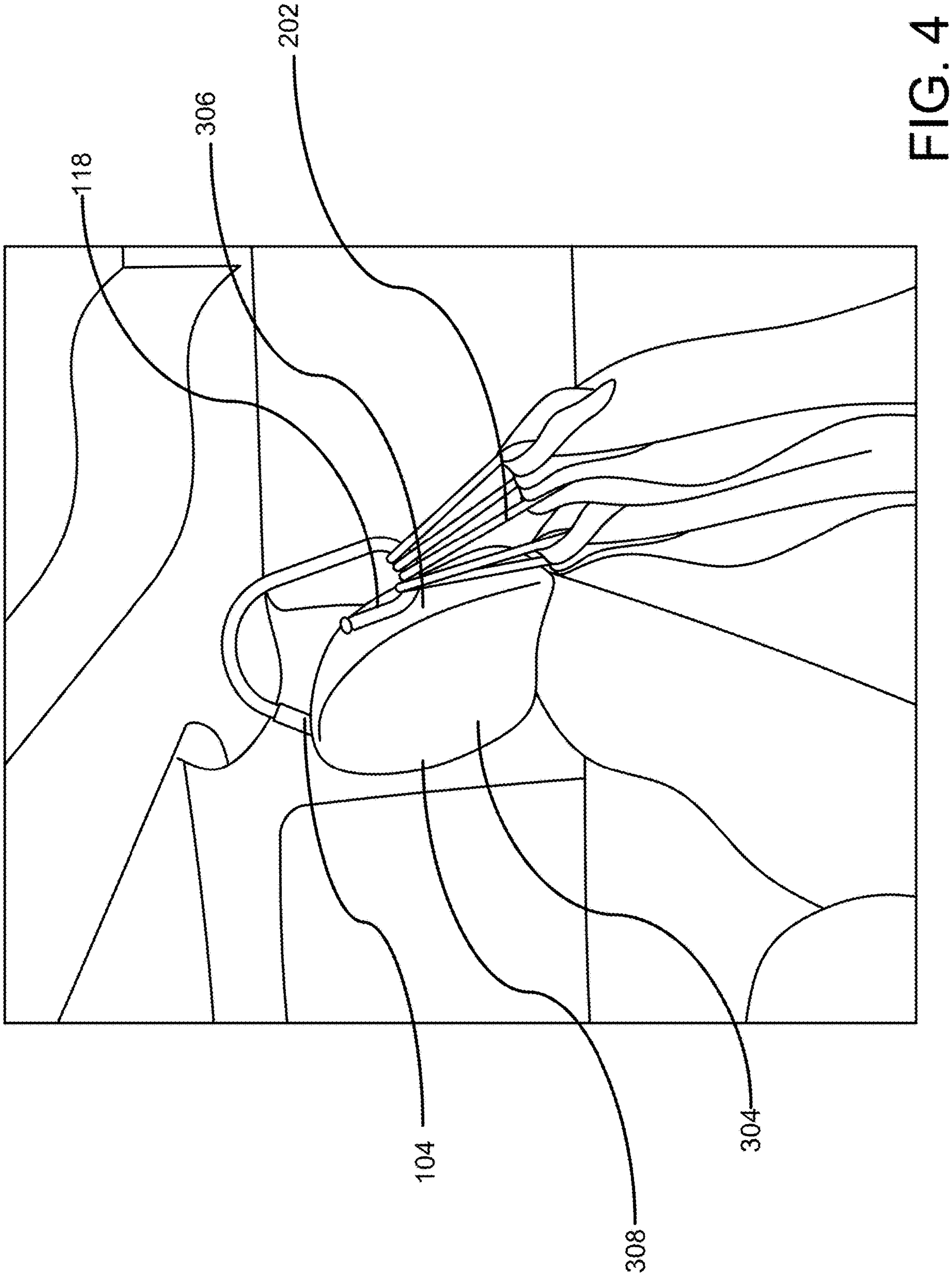
FIG. 4 illustrates a perspective view showing another way of using the portable hanger support device of the present invention in accordance with the disclosed structure.

FIG. 4 illustrates a perspective view showing another way of using the portable hanger support device of the present invention in accordance with the disclosed structure. In the present embodiment, the hanger stopper stub 118 abuts against the rear surface 306 of the headrest 304, and the right slant vertical segment member or portion 104 abuts against the front surface 308 of the headrest 304. The device 100 can easily scoop a plurality of hangers off a rack in one fluid motion, and the device 100 can be hooked onto the headrest 304.

Figure 5:
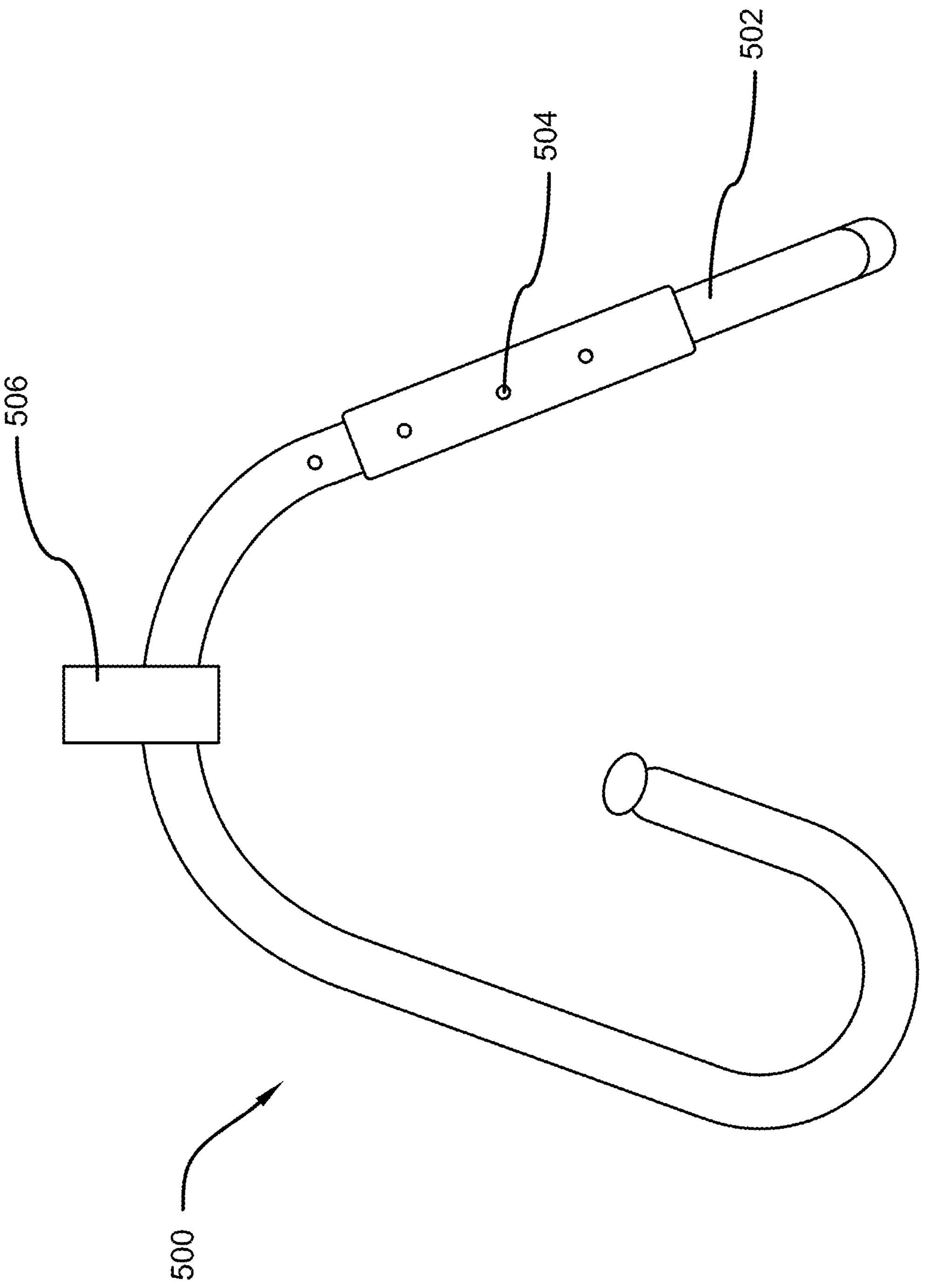
FIG. 5 illustrates a perspective view of another embodiment of the clothing supporting portable device of the present invention in accordance with the disclosed structure.

FIG. 5 illustrates a perspective view of another embodiment of the clothing supporting portable device of the present invention in accordance with the disclosed structure. In the present embodiment, the right slant vertical segment member 502 of the device 500 is telescoping and includes a plurality of telescoping pins 504. The right slant vertical segment member 502 can be adjusted to fit the device 500 to different headrests, and further, for helping in accommodating additional clothing. A latch or clip 506 is disposed on the downward concave upper sweeping hook 506 to further secure the device 500 around the headrests to prevent slipping or dislodging during transit.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein, "portable hanger support devices, "clothing supporting portable device", and "device" are interchangeable and refer to the portable hanger support device for vehicle headrests 100, 500 of the present invention.

Notwithstanding the foregoing, the portable hanger support device for vehicle headrests 100, 500 of the present invention can be of any suitable configuration as is known in the art without affecting the overall concept of the invention, provided that it accomplishes the above-stated objectives. One of ordinary skill in the art will appreciate that the portable hanger support device for vehicle headrests 100, 500 as shown in the FIGS. are for illustrative purposes only, and that many other configurations of the portable hanger support device for vehicle headrests 100, 500 are well within the scope of the present disclosure. Although the dimensions of the portable hanger support device for vehicle headrests 100, 500 are important design parameters for user convenience, the portable hanger support device for vehicle headrests 100, 500 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A portable garment hanger support device comprising:

a portable garment hanger device comprising a cylindrical rod including an upper hook portion, a right vertical segment portion, a left vertical segment portion, and a lower hook portion;

wherein said right vertical segment portion extends downward from a first end of said upper hook portion;

wherein said left vertical segment portion extends downward from an opposing second end of said upper hook portion;

wherein said right vertical segment portion having a first length;

wherein said left vertical segment portion having a second length;

wherein said second length is less than said first length;

wherein said upper hook portion anchorable over a vehicle headrest;

wherein said right vertical segment portion terminates at one free end including a first end cap;

wherein said left vertical segment portion terminates at another end connected to said lower hook portion;

wherein said right vertical segment portion abuts against one of a front surface and a rear surface of the vehicle headrest;

wherein said lower hook portion having an arc portion to accommodate a plurality of hangers;

wherein said lower hook portion having a hanger stopper stub extending upward from said arc portion; and further wherein said hanger stopper stub having a first grip forming an anti-slip area for retaining the plurality of hangers within said arc portion.

2. The portable garment hanger support device of claim 1, wherein said lower hook portion forming an open area between said hanger stopper stub and said left vertical segment portion for a user to access and hold said first grip.

3. The portable garment hanger support device of claim 2, wherein said hanger stopper stub abuts against another one of said front surface and said rear surface of the vehicle headrest.

4. The portable garment hanger support device of claim 3, wherein said hanger stopper stub having a terminal end including a second end cap.

5. The portable garment hanger support device of claim 4, wherein said right vertical segment portion having a second grip providing another handle for the user to carry said portable garment hanger device.

6. The portable garment hanger support device of claim 5, wherein said portable garment hanger device having a corrosion-resistant material selected from the group consisting of an aluminum and a plastic.

7. The portable garment hanger support device of claim 5, wherein said right vertical segment portion is a telescoping portion having a plurality of pins for adjusting said first length of said right vertical segment portion.

8. A portable garment hanger support device comprising:

a portable garment hanger device comprising a cylindrical rod including an upper hook portion, a right vertical segment portion, a left vertical segment portion, and a lower hook portion;

wherein said right vertical segment portion extends downward from a first end of said upper hook portion;

wherein said left vertical segment portion extends downward from an opposing second end of said upper hook portion;

wherein said right vertical segment portion having a first length;

wherein said left vertical segment portion having a second length;

wherein said second length is less than said first length;

wherein said upper hook portion anchorable over a vehicle headrest;

wherein said right vertical segment portion terminates at one free end including a first end cap;

wherein said left vertical segment portion terminates at another end connected to said lower hook portion;

wherein said right vertical segment portion abuts against one of a front surface and a rear surface of the vehicle headrest;

wherein said lower hook portion having an arc portion to accommodate a plurality of hangers;

wherein said lower hook portion having a hanger stopper stub extending upward from said arc portion;

wherein said hanger stopper stub having a first grip forming an anti-slip area for retaining the plurality of hangers within said arc portion;

wherein said hanger stopper stub abuts against another one of said front surface and said rear surface of the vehicle headrest; and further wherein said right vertical segment portion having a second grip providing another handle for the user to carry said portable garment hanger device.

9. The portable garment hanger support device of claim 8, wherein said lower hook portion forming an open area between said hanger stopper stub and said left vertical segment portion for a user to access and hold said first grip.

10. The portable garment hanger support device of claim 9, wherein said hanger stopper stub having a terminal end including a second end cap.

11. The portable garment hanger support device of claim 10, wherein said right vertical segment portion is a telescoping portion having a plurality of pins for adjusting said first length of said right vertical segment portion.

12. The portable garment hanger support device of claim 11, wherein said portable garment hanger device having a corrosion-resistant material selected from the group consisting of an aluminum and a plastic.

13. A portable garment hanger support device comprising:

a portable garment hanger device comprising a cylindrical rod including an upper hook portion, a right vertical segment portion, a left vertical segment portion, and a lower hook portion;

wherein said right vertical segment portion extends downward from a first end of said upper hook portion;

wherein said left vertical segment portion extends downward from an opposing second end of said upper hook portion;

wherein said right vertical segment portion having a first length;

wherein said left vertical segment portion having a second length;

wherein said second length is less than said first length;

wherein said upper hook portion resting on a top surface of a vehicle headrest when said portable garment hanger device is installed in the vehicle;

wherein said right vertical segment portion terminates at one free end including a first end cap;

wherein said left vertical segment portion terminates at another end connected to said lower hook portion;

wherein said lower hook portion having an arc portion to accommodate a plurality of hangers;

wherein said lower hook portion having a hanger stopper stub extending upward from said arc portion; and further wherein said hanger stopper stub having a first grip forming an anti-slip area for retaining the plurality of hangers within said arc portion.

14. The portable garment hanger support device of claim 13, wherein said lower hook portion forming an open area between said hanger stopper stub and said left vertical segment portion for a user to access and hold said first grip.

15. The portable garment hanger support device of claim 14, wherein said right vertical segment portion abuts against one of a front surface and a rear surface of the vehicle headrest.

16. The portable garment hanger support device of claim 15, wherein said hanger stopper stub abuts against another one of said front surface and said rear surface of the vehicle headrest.

17. The portable garment hanger support device of claim 16, wherein said hanger stopper stub having a terminal end including a second end cap.

18. The portable garment hanger support device of claim 17, wherein said right vertical segment portion having a second grip providing another handle for the user to carry said portable garment hanger device.

19. The portable garment hanger support device of claim 18, wherein said portable garment hanger device having a corrosion-resistant material selected from the group consisting of an aluminum and a plastic.

20. The portable garment hanger support device of claim 19, wherein said right vertical segment portion is a telescoping portion having a plurality of pins for adjusting said first length of said right vertical segment portion.

* * * * *